(12) United States Patent
Anderson et al.

(10) Patent No.: US 10,526,917 B2
(45) Date of Patent: Jan. 7, 2020

(54) PLATFORM LIP IMPINGEMENT FEATURES

(71) Applicant: United Technologies Corporation, Farmington, CT (US)

(72) Inventors: Corey D. Anderson, East Hartford, CT (US); Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/884,473

(22) Filed: Jan. 31, 2018

(65) Prior Publication Data

US 2019/0234234 A1    Aug. 1, 2019

(51) Int. Cl.
*F01D 25/12*    (2006.01)
*F01D 9/04*    (2006.01)

(52) U.S. Cl.
CPC ............ *F01D 25/12* (2013.01); *F01D 9/041* (2013.01); *F05D 2220/323* (2013.01); *F05D 2240/12* (2013.01); *F05D 2240/80* (2013.01); *F05D 2260/201* (2013.01)

(58) Field of Classification Search
CPC .... F01D 25/12; F01D 9/041; F05D 2220/323; F05D 2240/12; F05D 2240/80; F05D 2260/201
USPC ........................................................ 415/115
See application file for complete search history.

(56) References Cited

U.S. PATENT DOCUMENTS

| | | |
|---|---|---|
| 7,004,721 B2 | 2/2006 | Imbourg et al. |
| 7,452,184 B2 * | 11/2008 | Durocher ............... F01D 5/081 |
| | | 415/115 |
| 8,002,521 B2 | 8/2011 | Maltson |
| 8,246,297 B2 * | 8/2012 | Jain ......................... F01D 11/08 |
| | | 415/116 |
| 2006/0127212 A1 | 6/2006 | Durocher et al. |
| 2016/0312631 A1 * | 10/2016 | Bergman .............. F01D 11/001 |
| 2017/0234218 A1 | 8/2017 | Cupini et al. |
| 2018/0195400 A1 * | 7/2018 | Granberg ................ F01D 5/186 |

FOREIGN PATENT DOCUMENTS

| | | |
|---|---|---|
| DE | 102008055574 A1 | 7/2009 |
| EP | 0911487 A1 | 4/1999 |
| EP | 1249575 A1 | 10/2002 |
| EP | 1503046 A2 | 2/2005 |
| EP | 2093381 A1 | 8/2009 |
| EP | 3156592 A1 | 4/2017 |
| WO | 2015112227 A2 | 7/2015 |

OTHER PUBLICATIONS

European Search Report for European Application No. 19154273.7 dated Jun. 25, 2019.

* cited by examiner

*Primary Examiner* — Nathaniel E Wiehe
*Assistant Examiner* — David Whittaker
(74) *Attorney, Agent, or Firm* — Carlson, Gaskey & Olds, P.C.

(57) ABSTRACT

An exemplary gas turbine engine includes a turbine section positioned about an engine central longitudinal axis. The turbine section includes a component with a platform providing a lip, a rail extending radially from the platform and at an axial location spaced from an outer axial extension of the lip. An inner face of the rail and a surface of the platform at least partially provide a cavity. At least one opening extends from the inner face to an outer face of the rail opposite the inner face to provide fluid communication from the cavity to the lip.

20 Claims, 12 Drawing Sheets

PLATFORM LIP IMPINGEMENT FEATURES

STATEMENT REGARDING FEDERALLY SPONSORED RESEARCH OR DEVELOPMENT

This invention was made with Government support under W58RGZ-16-C-0046 awarded by the United States Army. The Government has certain rights in this invention.

BACKGROUND

This disclosure relates to cooling for a component of a gas turbine engine, and more particularly a component having one or more impingement cooling features.

Gas turbine engines can include a fan for propulsion air and to cool components. The fan also delivers air into an engine core where it is compressed. The compressed air is then delivered into a combustion section, where it is mixed with fuel and ignited. The combustion gas expands downstream and drives turbine blades. Static vanes are positioned adjacent to the turbine blades to control the flow of the products of combustion. The blades and vanes are subject to extreme heat, and thus cooling schemes are utilized for each.

SUMMARY

A gas turbine engine according to an example of the present disclosure includes a turbine section positioned about an engine central longitudinal axis. The turbine section includes a component with a platform providing a lip, a rail extending radially from the platform with respect to the engine central longitudinal axis and at an axial location spaced from an outer axial extension of the lip. An inner face of the rail and a surface of the platform at least partially provide a cavity. An opening extends from the inner face to an outer face of the rail opposite the inner face to provide fluid communication from the cavity to the lip. A cross section of the opening at the outer face has a height extending in a first direction along the outer face and a width extending in a second direction along the outer face. The first direction is different than the second direction, and the width is greater than the height.

In a further embodiment according to any of the foregoing embodiments, the cross section is arc-shaped, the width is a circumferential width with respect to the arc-shape, and the height is a radial height with respect to the arc-shape.

In a further embodiment according to any of the foregoing embodiments, the cross section is rectangular, and the width is a rectangular width perpendicular to the height.

In a further embodiment according to any of the foregoing embodiments, the gas turbine engine includes a plurality of circumferentially spaced openings extending from the inner face to the outer face.

In a further embodiment according to any of the foregoing embodiments, the rail is an aft rail of a platform of a vane.

In a further embodiment according to any of the foregoing embodiments, the opening is angled such that an axis through the opening intersects a radially inner surface of the lip at a target point configured to receive the fluid communication from the cavity to the lip.

In a further embodiment according to any of the foregoing embodiments, the gas turbine engine has a sloped flow diverter at the outer face.

A gas turbine engine according to an example of the present disclosure includes a turbine section positioned about an engine central longitudinal axis. A vane section within the turbine section includes a platform providing a lip and a rail extending radially from the platform with respect to the engine central longitudinal axis and at an axial location spaced from an outer axial extension of the lip. An inner face of the rail and a surface of the platform at least partially provide a cavity. An opening extends from the inner face to an outer face of the rail opposite the inner face to provide fluid communication from the cavity to the lip. The opening is angled such that an axis extending through the opening intersects a radially inner surface of the lip at a target point configured to receive the fluid communication from the cavity to the lip.

In a further embodiment according to any of the foregoing embodiments, the axis of the opening and the engine center axis define an angle between 20 and 60 degrees.

In a further embodiment according to any of the foregoing embodiments, the gas turbine engine includes a rotor section axially aft of the vane section and having a blade extending from a rotor platform. The target point is axially forward of a forward-most surface of the rotor platform.

In a further embodiment according to any of the foregoing embodiments, a portion of the platform of the vane section is radially outward of and axially aligned with a portion of the rotor platform to provide a radial gap therebetween.

In a further embodiment according to any of the foregoing embodiments, the opening is angled to direct the fluid communication axially along inner surface of the lip and through the radial gap.

In a further embodiment according to any of the foregoing embodiments, wherein the inner surface of the lip extends axially from the outer face of the rail to an aft-most edge of the platform, and the inner surface of the lip is parallel with the engine central longitudinal axis.

A gas turbine engine according to an example of the present disclosure includes a turbine section positioned about an engine central longitudinal axis. A vane section within the turbine section includes a platform providing a lip and having a rail extending radially from the platform with respect to the engine central longitudinal axis and at an axial location spaced from an outer axial extension of the lip. An inner face of the rail and a surface of the platform at least partially provide a cavity. A first opening extends from the inner face to an outer face of the rail opposite the inner face to provide fluid communication from the cavity to the lip. A support includes a body portion radially inward of the platform and an extension extending radially outward from the body portion, the extension provides a mating face to interface with the outer face of the rail. The extension provides a second opening radially and circumferentially aligned with the first opening. The first opening has a first cross sectional area at the outer face, the second opening has a second cross sectional area at the mating face, and the first cross sectional area is different from the second cross sectional area.

In a further embodiment according to any of the foregoing embodiments, the first cross sectional area is greater than the second cross sectional area.

In a further embodiment according to any of the foregoing embodiments, the first cross sectional area includes a first portion radially outward of the second cross sectional area and a second portion radially inward of the second cross sectional area.

In a further embodiment according to any of the foregoing embodiments, the second cross sectional area is greater than the first cross sectional area.

In a further embodiment according to any of the foregoing embodiments, the second cross sectional area includes a first portion radially outward of the first cross sectional area and a second portion radially inward of the first cross sectional area.

In a further embodiment according to any of the foregoing embodiments, one of the first opening and second opening is angled such that an axis through the opening intersects a radially inner surface of the lip at a target point configured to receive the fluid communication from the cavity to the lip.

In a further embodiment according to any of the foregoing embodiments, the other of the first opening and the second opening has a greater cross sectional area than the one of the first opening and the second opening.

These and other features disclosed herein can be best understood from the following specification and drawings, the following of which is a brief description.

DETAILED DESCRIPTION

Figure 1:
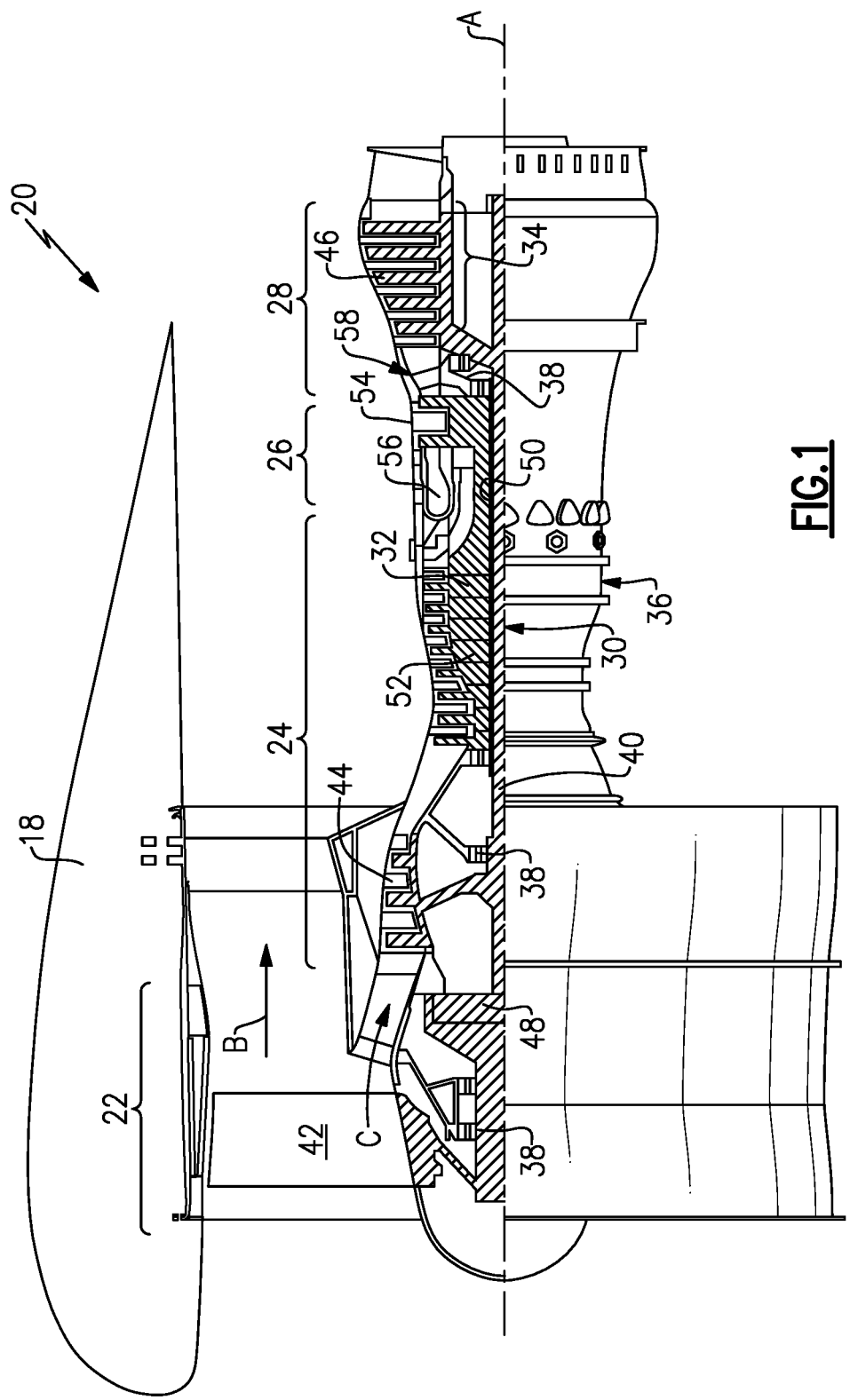
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction read [(Tram ° R)/(518.7° R)]^0.5. The "Low corrected fan tip speed" as disclosed herein according to one non-limiting embodiment is less than about 1150 ft/second (350.5 meters/second).

Figure 2:
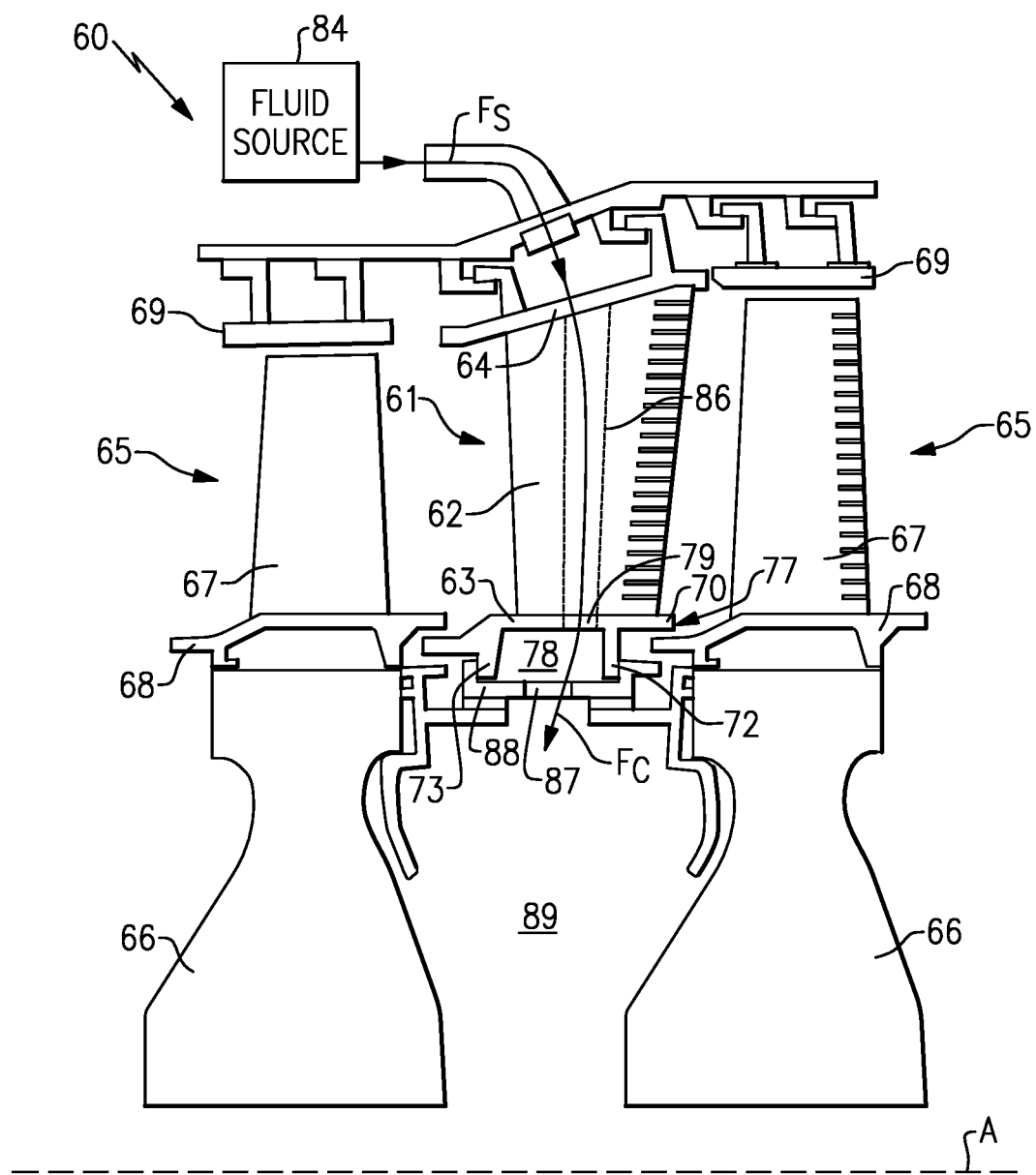
FIG. 2 shows an example section of a gas turbine engine.

FIG. 2 shows selected portions of a section 60 of a gas turbine engine, such as the turbine section 28 of the engine 20 of FIG. 1. Although a turbine section is disclosed as an example, the teachings of this disclosure may also benefit a compressor section. In this example, the section 60 includes one or more vane sections 61, each having an airfoil section 62 extending between an inner platform 63 and an outer platform 64. The vane section 61 is spaced axially from one or more rotor sections 65. The rotor sections 65 may each include a rotor disk 66 carrying one or more blades 67 extending from a platform 68 and for rotation about the engine central longitudinal axis A. The rotor sections 65 may include a blade outer air seal 69 ("BOAS") radially outward of the blades 67. Although the exemplary arrangements discussed herein refer to the inner platform 63 of the vane section 61, other engine components of the section 60 can benefit from the teachings herein, such as the outer platform 64 of the vane section 61, the platform 68 of the rotor blade 67, and the BOAS 69, for example.

A fluid source 84 communicates fluid flow $F_S$ (shown schematically), such as cooling air, through the outer platform 64, and into internal channel 86 of the airfoil section 62. Air then passes through an opening 79 in the platform 63 to a cavity 78. The cavity 78 is provided at least partially by the platform 63 and an aft rail 72 and forward rail 73 extending inwardly from the platform 63. The aft rail 72 is at an axial location spaced from an outer axial extension 77 of a lip 70 of platform 63. A portion $F_C$ of the fluid may then exit the cavity 78 through an orifice 87 in a support 88, one non-limiting example being a seal, radially inward of the platform 63 to the pressurized cavity 89 between adjacent rotor disks 66. In the prior art, leakage flow from the cavity 89 was utilized to cool various parts of the section 60, such as the lip 70 of the platform 63. However, this leakage flow was often at high temperature when it reached the lip 70, due to the pressurizing of the cavity 89 and convective heat transfer from other components in the section 60.

Figure 3:
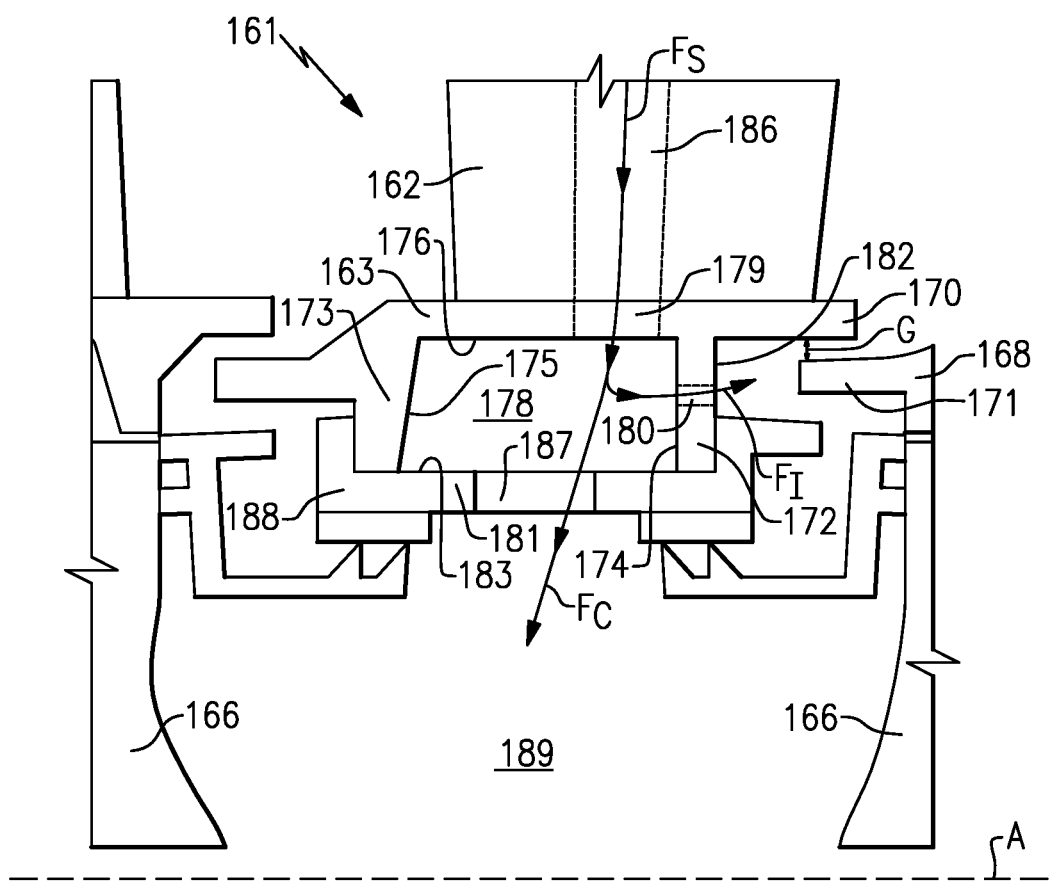
FIG. 3 schematically illustrates a fluid flow through an example section of a gas turbine engine.

FIG. 3 schematically illustrates a fluid $F_S$ flowing through a portion of an example vane section 161. In this disclosure, like reference numerals designate like elements where appropriate, and reference numerals with the addition of one-hundred or multiples thereof designate modified elements that are understood to incorporate the same features and benefits of the corresponding original elements. Fluid $F_S$ flows through the internal channel 186 through the opening 179 in the platform 163 to a cavity 178. The cavity 178 is provided by an inner or forward face 174 of the rail 172, an inner or aft face 175 of a forward rail 173 spaced axially from the rail 172, an undersurface 176 of the platform 163 opposite the airfoil section 162, and a radially outer surface 183 of an annular main body portion 181 of the support 188.

One or more openings 180 extend from the inner face 174 of the rail 172 to an outer or aft face 182 of the rail 172 opposite the face 174 to provide fluid communication from the cavity 178 to the lip 170 of the platform 163. The example openings 180 utilize a portion of the flow $F_S$ to provide a dedicated impingement cooling flow $F_I$ from the cavity 178 to the lip 170. The lip 170 is exposed to high temperatures from the gas path and due to its proximity to the rotating rotor platform lip 171. In the example, a second portion $F_C$ of the flow $F_S$ exits the cavity 178 through the orifice 187 in the support 188 to the pressurized cavity 189. Although the exemplary arrangements discussed herein refer to an aft or trailing edge lip 170, a forward or leading edge lip of any of the examples could benefit from the teachings herein. As shown, a portion of the lip 170 may be radially outward of and axially aligned with a forward lip 171 of an adjacent rotor platform 168. A radial gap G is provided between the lip 170 and the lip 171. The fluid flow $F_I$ is directed through the gap G in some examples.

Figure 4A:
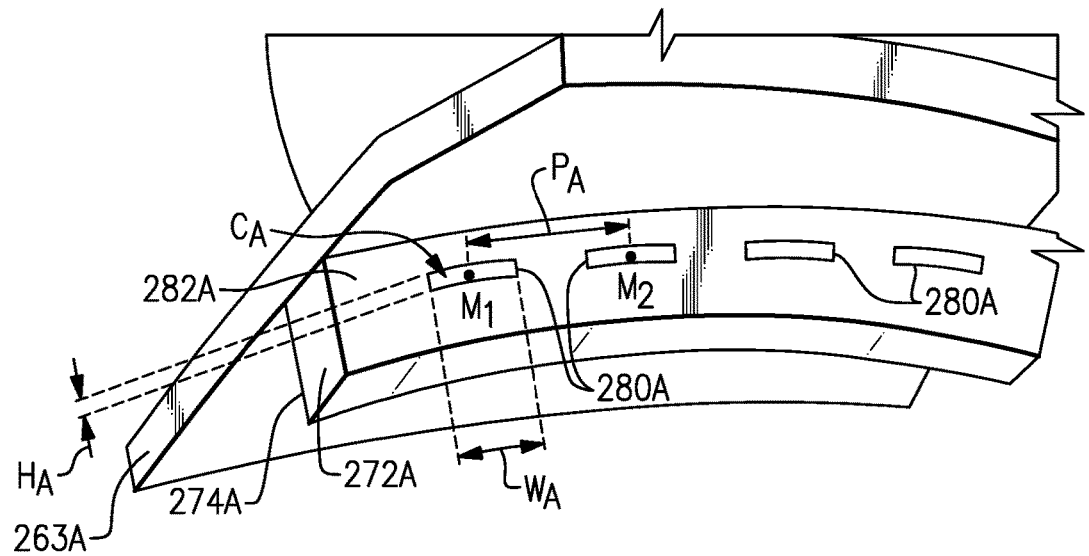
FIG. 4A is a sectional view of example openings.

FIG. 4A illustrates an example arrangement of circumferentially spaced openings 280A in a rail 272A (such as rail 72 of FIG. 2) of a platform 263A. The example openings 280A are slot-shaped, in that, with reference to the cross section $C_A$ of the opening 280A at the aft face 282A, a width $W_A$ is greater than a height $H_A$. The openings 280A each have an arc-shaped cross section $C_A$, such that the width $W_A$ is a circumferential width with respect to the arc-shape and the height $H_A$ is a radial height with respect to the arc-shape. Other shapes having a greater width than height may be utilized. In some examples, the openings 280A extend circumferentially about the engine central longitudinal axis A (see FIG. 2), such that the width $W_A$ is a circumferential width about the axis A and the height $H_A$ is a radial height. In some examples, the height $H_A$ is 4-60% of the width $W_A$. The height $H_A$ may range from about 0.012 inches to 0.030 inches (about 0.30 mm to 0.76 mm), and the width $W_A$ may range from about 0.050 inches to 0.300 inches (about 1.27 mm to 7.62 mm) in some examples. A pitch distance $P_A$ is defined by the distance between midpoints $M_1$ and $M_2$ of adjacent openings 280A. The midpoints $M_1$, $M_2$ are defined relative to the width $W_A$ of their respective openings 280A. In some examples, a coverage ratio is defined by the width $W_A$ of an opening 280A divided by the average pitch distance $P_A$ to one or two directly adjacent openings and ranges from about 20% to 80%. The openings 280A may have a constant or varying cross sectional area as they extend axially from the face 274A to the face 282A. Although four slot-shaped openings 280A are shown in the example, more or fewer openings may be utilized in other examples.

Figure 4B:
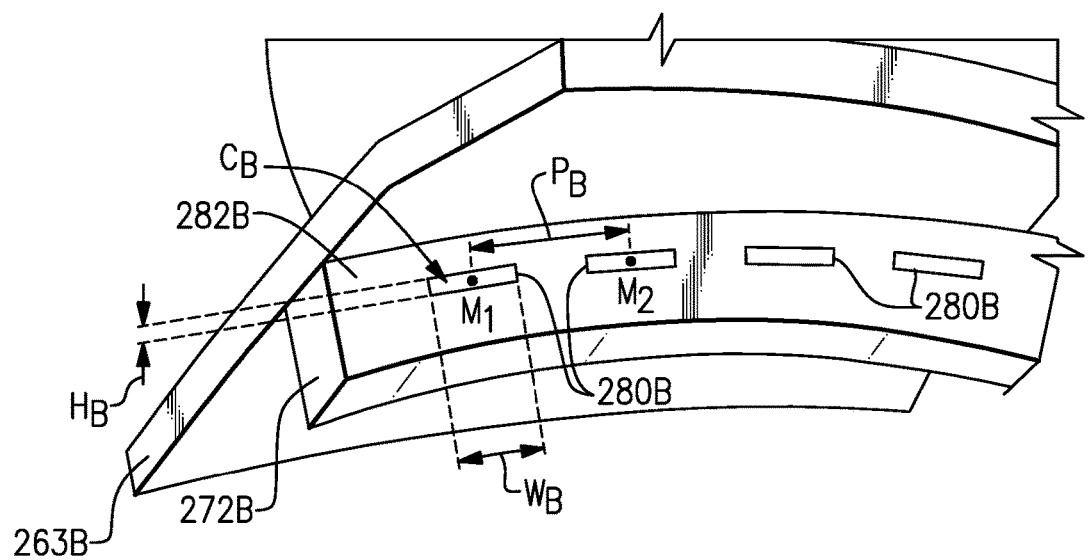
FIG. 4B is a sectional view of other example openings.

FIG. 4B illustrates another example arrangement of slot-shaped openings 280B, which is generally similar to arrangement of the openings 280A, except that the openings 280B have a rectangular cross section $C_B$ at the face 282B. The width $W_B$ is a rectangular width, the height $H_B$ is a rectangular height, and the width $W_B$ is perpendicular to the height $H_B$. The dimensional values and relationships $H_A/W_A/P_A$ disclosed in the example openings 280A could also be utilized for $H_B/W_B/P_B$ in openings 280B in some examples.

Figure 4C:
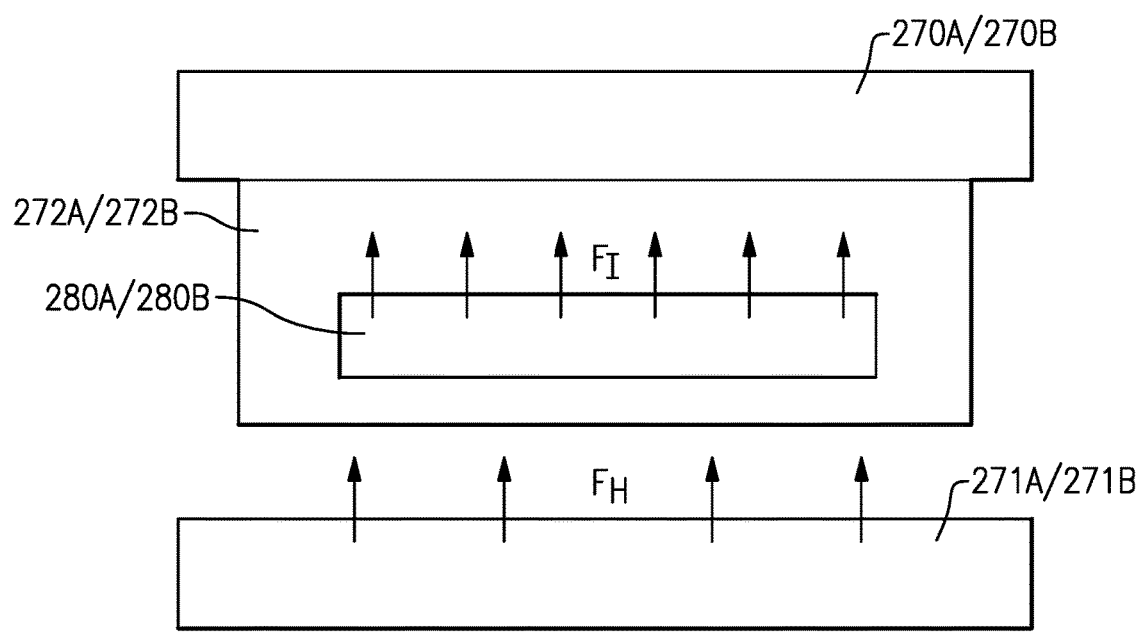
FIG. 4C schematically illustrates a cooling arrangement according to the examples in FIGS. 4A and 4B.

As shown schematically in FIG. 4C, with continued reference to FIGS. 4A and 4B, in some applications, providing openings 280A/280B that are slot-shaped provides improved cooling to the lip 270A/270B. Providing slot-shaped openings 280A/280B may reduce a vortex component of the fluid flow $F_I$ flowing through the openings 280A/280B, as compared with other shapes, such as cylindrical shapes in some applications. This reduction in the vortex component of the fluid flow $F_I$ results in a reduction of hot fluid $F_H$ drawn up toward the lip 270A/270B, such as hot air from the gas path off the lip 271A/271B of an adjacent rotor blade. The slot-shaped openings 280A/280B may further provide a greater surface area of fluid flow $F_I$ between the hot fluid $F_H$ and the lip 271A/271B, as compared with other shapes, which may result in better insulation of the lip 270A/270B and increased cooling. The slot-shaped openings 280A/280B may also provide greater volume of fluid flow $F_I$ than other shapes.

Figure 5:
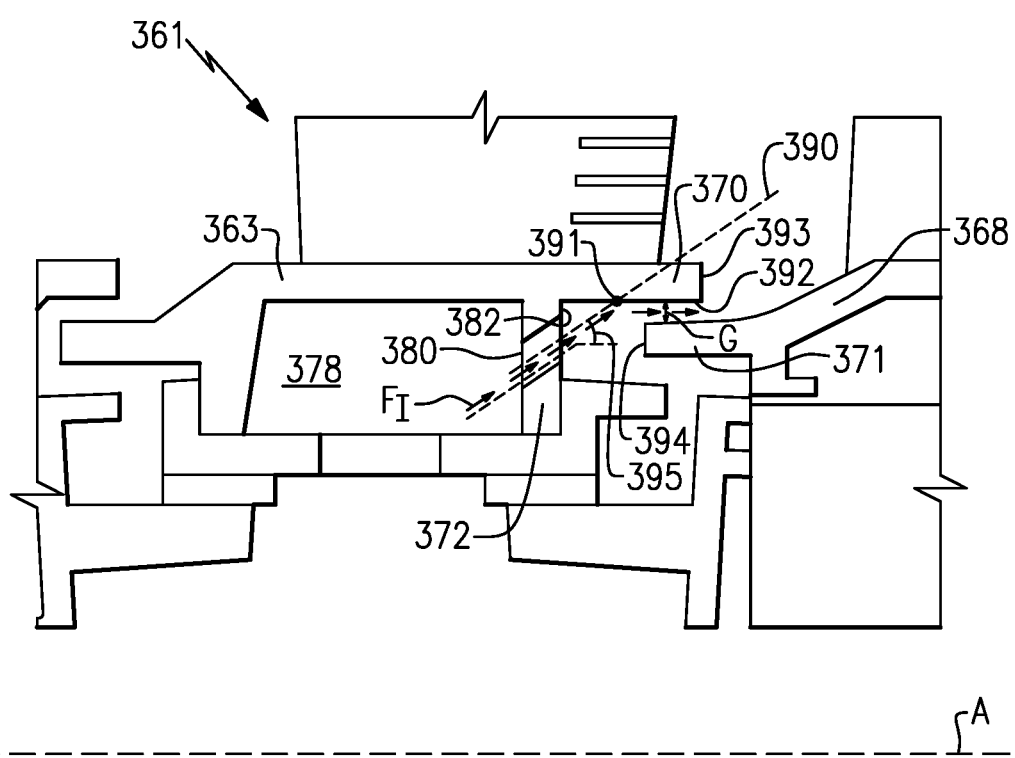
FIG. 5 schematically illustrates another example cooling arrangement.

FIG. 5 schematically illustrates another cooling arrangement of an example vane section 361. An example rail 372 of a platform 363 provides angled openings 380 extending from the cavity 378, such that an axis 390 extending through each opening 380 extends from the cavity 378 toward the lip 370, the example axis 390 extending radially outward as it extends axially aft. The openings 380 may be angled such that the axis 390 intersects a target point 391 on the inner surface 392 of the lip 370. The target point 391 is configured to receive the fluid flow $F_I$, which then flows aft along the surface 392 of the lip 370 to provide impingement cooling to the lip 370. The flow $F_I$ may flow axially along the surface 392 through a radial gap G between the lip 371 and the lip 370. In some examples, the surface 392 extends parallel to the engine central longitudinal axis A from the outer face 382 of the rail 372 to the aft-most edge surface 393 of the platform 363. The openings 380 may have any cross sectional shape, including those shown in FIGS. 4A and 4B or a cylindrical cross section in some examples.

The target point 391 may be axially forward of the forward-most face 394 of the rotor platform lip 371, such that the fluid $F_I$ flowing out of the openings 380 toward the lip 370 may avoid contacting the rotor platform lip 371 before reaching the target point 391. In some examples, the axis 390 forms an angle 395 with the engine central longitudinal axis A between 20 and 60 degrees. The target point 391 may be axially closer to the face 382 than the surface 393.

Figure 6A:
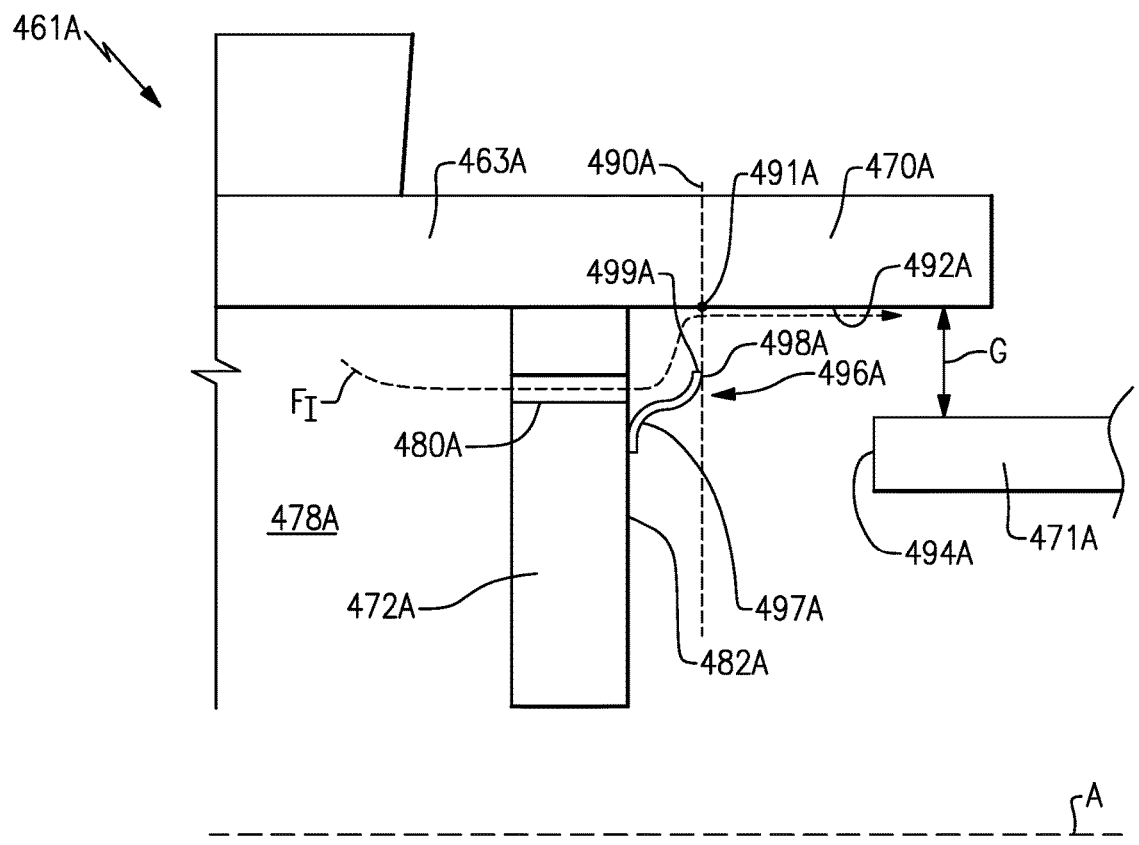
FIG. 6A schematically illustrates another example cooling arrangement.

FIG. 6A schematically illustrates an example cooling arrangement of a vane section 461A. A rail 472A includes a flow diverter 496A for diverting the flow $F_I$ toward the lip 470A. The example flow diverter 496A includes an attachment portion 497A for attaching the flow diverter 496A to the aft face 482A of the rail 472A at a section radially inward of the openings 480A and a diverting portion 498A for diverting the fluid $F_I$ toward the lip 470A. The diverting portion 498A is sloped such that it extends radially outward as it extends axially aft for deflecting the fluid $F_I$ outward toward the lip 470. In some examples, the example flow diverter 496A may be a piece of sheet metal attached to the rail 472A, such as by welding. As one alternative, the flow diverter 496A may be cast as part of the rail 472A. The rail 472A may include a single flow diverter 496A that extends along multiple openings 480A or may include an individual flow diverter 496A for each of the openings 480A. In some examples, the flow diverter 496A is axially between the face 482A and the forward-most edge face 494A of the adjacent rotor platform lip 471A. All or a portion of the flow diverter 496A may be radially outward of the adjacent rotor platform lip 471A. As shown, the openings 480A are substantially parallel to the engine central longitudinal axis A, but the flow diverter 496A may also be utilized with angled openings, such as those shown in FIG. 5, for example. The openings 480A may have any cross sectional shape, including those shown in FIGS. 4A and 4B or a cylindrical cross section in some examples.

The example flow diverting portion 498A is concave, and the concave surface receives and diverts the fluid $F_I$. An axis 490A tangential to the diverting portion 498A at the radially outer edge 499A of the diverting portion 498A intersects the lip 470A at target point 491A. Thus, the flow $F_I$ is directed to the target point 491A and axially aft along the radially inner surface 492A of the lip 470A. In the example, the target point 491A is axially forward the face 494A. The flow $F_I$ may be directed along the surface 492A through a radial gap G between the lip 470A and the lip 471A. The radially outer edge 499A of the example diverting portion 498A is radially outward of the openings 480A.

Figure 6B:
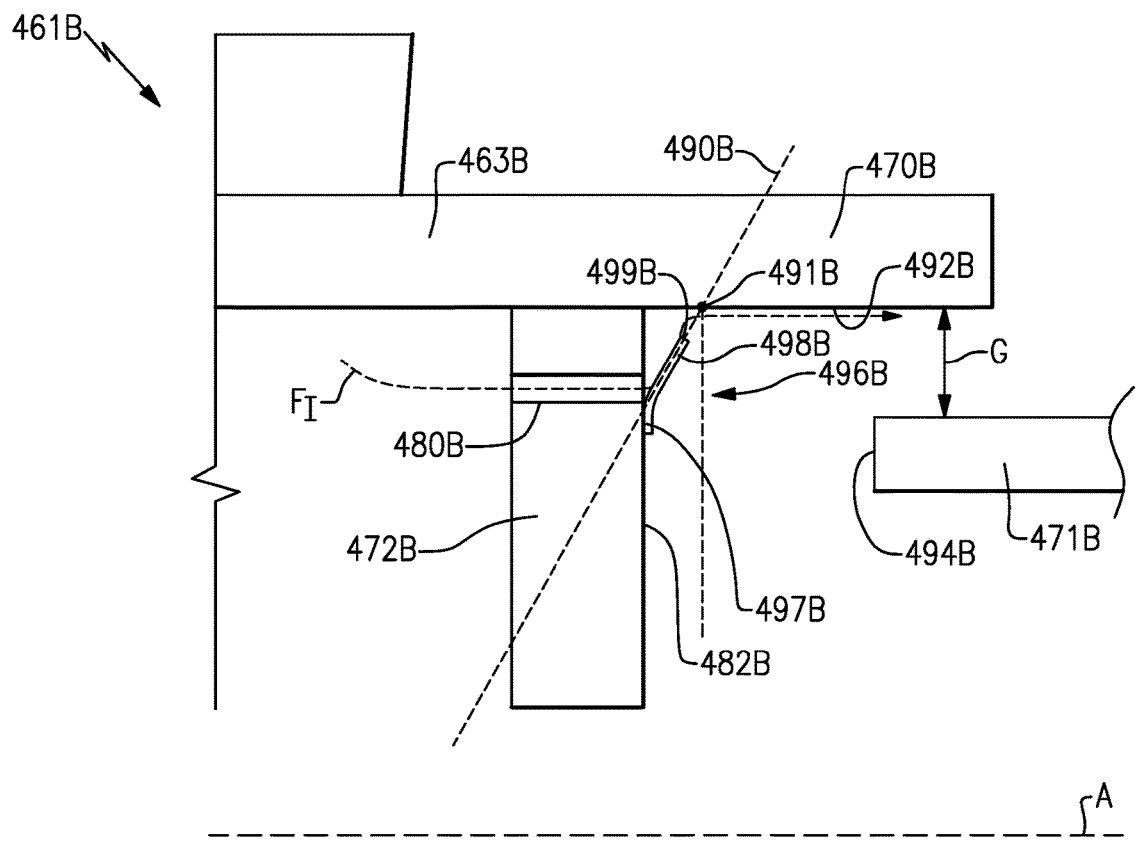
FIG. 6B schematically illustrates another example cooling arrangement.

FIG. 6B schematically illustrates an example cooling arrangement of a vane section 461B generally similar to the arrangement shown in FIG. 6A, except that the flow diverting portion 498B has a constant slope, and the axis 490B is an extension of the slope. The axis 490B intersects the lip 470B at target point 491B, such that the flow $F_I$ is directed to the target point 491B and axially aft along the radially inner surface 492B of the lip 470B. In the example, the target point 491B is axially forward of the forward-most face 494B of the adjacent rotor lip 471B. The flow $F_I$ may be directed along the surface 492B of the lip 470B through a radial gap G between the lip 470B and the lip 471B.

Figure 7A:
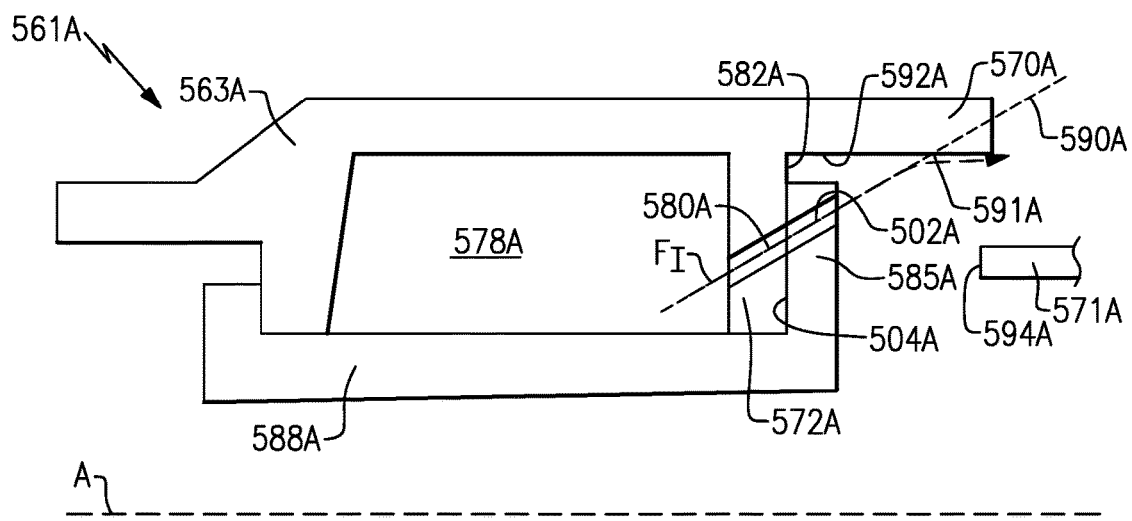
FIG. 7A schematically illustrates another example cooling arrangement.

FIG. 7A illustrates an example vane section 561A. in which openings 580A are provided in the rail 572A and openings 502A are provided in an extension 585A of the support 588A, which extends radially outward of the openings 580A. In the example, both of the openings 580A and 502A are angled to extend radially outward and axially aft such that an axis 590A extending through both of the openings 580A and 502A intersects a target point 591A on the inner surface 592A of the lip 570A. The openings 580A and 502A may be angled between 20 and 60 degrees with the engine central longitudinal axis A in some examples. The target point 591A may be axially forward of a forward-most face 594A of an adjacent rotor platform lip 571A. In other examples, one or both of the openings 580A and 502A are parallel to the engine central longitudinal axis A. The openings 580A and 502A may be machined or drilled after the support 588A receives the platform 563A. The openings 580A and 502A are radially and circumferentially aligned at the face 582A and a forward or mating face 504A of the extension 585A to provide fluid communication between the cavity 578A and the lip 570A. The mating face 504A interfaces with the face 582A.

Figure 7B:
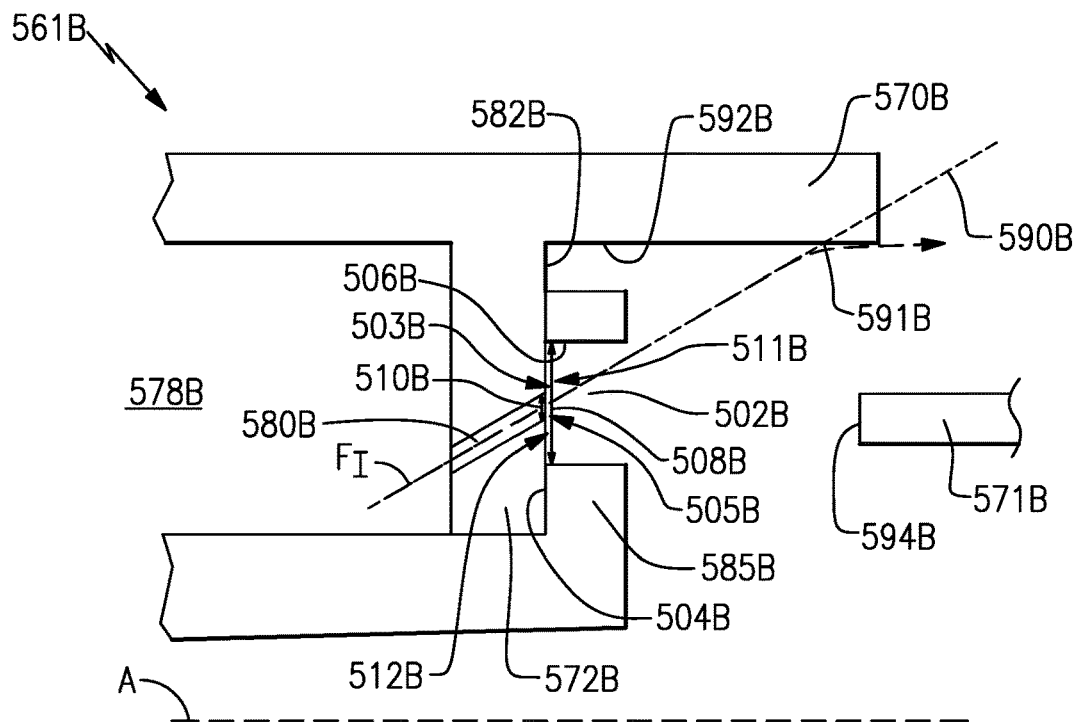
FIG. 7B schematically illustrates another example cooling arrangement.

FIG. 7B illustrates another example vane section 561B generally similar to that of FIG. 7A, except that the openings 502B have a greater cross sectional area 503B at the face 504B of the extension 585B than the cross sectional area 505B of the openings 580B at the face 582B. This size relationship between the openings 502B and 580B provides added tolerance for fluid communication between the openings 502B and 580B, such that the extension 585B does not prevent fluid communication between the cavity 578B and the lip 570B through the openings 580B. As one example, a radial height 508B of the opening 502B at the face 504B is greater than a radial height M0B of the opening 580B at the face 582B. A portion 511B of the opening 502B at the face 504B extends radially outward of the opening 580B at the face 582B, and a portion 512B of the opening 502B at the face 504B extends radially inward of the opening 580B at the face 582B. In some examples, the radial height 508B is at least 0.100 inches greater than the radial height 510B. The openings 580B are angled to extend radially outward such that an axis 590B extending through the openings 580B intersects a target point 591B on the inner surface 592B of the lip 570B. The openings 580B may be angled between 20 and 60 degrees with the engine central longitudinal axis A in some examples. The openings 502B may be sized such that the axis 590B does not intersect with the radially outer edge 506B of the opening 502B. The opening 502B extends parallel to the engine central longitudinal axis A in some examples. The cross section of the opening 502B may be constant or varying as the opening 502B extends axially.

Figure 7C:
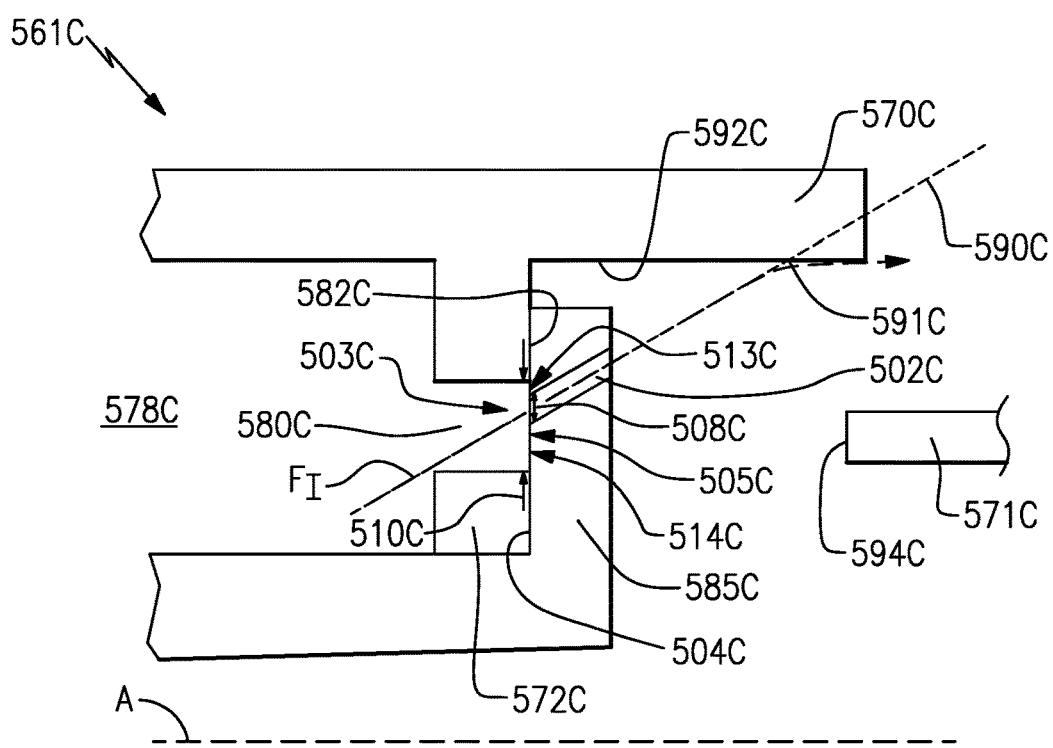
FIG. 7C schematically illustrates another example cooling arrangement.

FIG. 7C shows another example vane section 561C generally similar to that of FIGS. 7A and 7B, except that the openings 580C have a greater cross sectional area 505C at the aft face 582C of the rail 572C than the cross sectional area 503C of the opening 502C at the forward face 504C of the extension 585C. This size relationship between the openings 502C and 580C provides added tolerance for fluid communication between the openings 502C and 580C such that the extension 585C does not prevent fluid communication between the cavity 578C and the lip 570C. As one example, a radial height 510C of the opening 580C at the face 582C is greater than a radial height 508C of the opening 502C at the face 504C. In some examples, the radial height 510C is at least 0.100 inches greater than the radial height 508C. A portion 513C of the opening 580C at the face 582C extends radially outward of the opening 502C at the face 504C, and a portion 514C of the opening 580C at the face 582C extends radially inward of the opening 502C at the face 504C. The openings 502C are angled such that an axis 590C extending through the openings 502C intersects a target point 591C on the inner surface 592C of the lip 570C. The openings 502C may be angled between 20 and 60 degrees with the engine central longitudinal axis A in some examples. The openings 580C may extend parallel to the engine center axis A in some examples. The cross section of the opening 580C may be constant or varying as the opening 580C extends axially.

Referring to FIGS. 7A-7C generally, the openings 580A/580B/580C and 502A/502B/502C may have any cross sectional shape, including those shown in FIGS. 4A and 4B or a cylindrical cross section in some examples.

Figure 8:
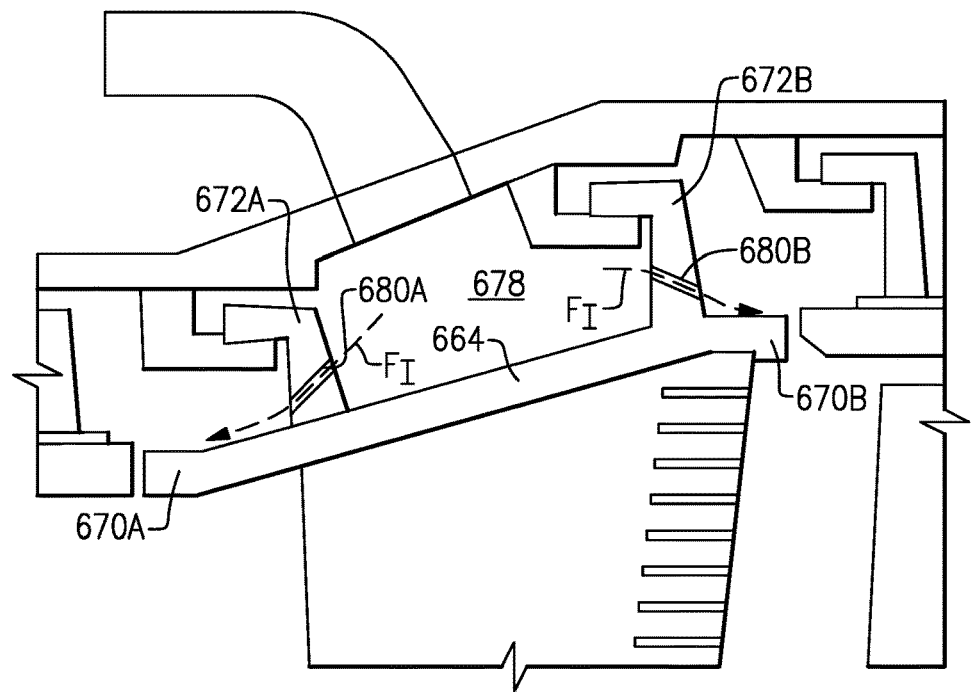
FIG. 8 schematically illustrates another example cooling arrangement.

FIG. 8 illustrates an example outer platform 664 having openings 680A/680B in support rails 672A/672B. The rails 672A/672B and platform 664 provide a cavity 678, and the openings 680A/680B communicate fluid $F_I$ between a cavity 678 and the respective lips 670A/670B of the platform 664. The openings 680A/680B may be included in one or both support rails 672A/672B.

Figure 9:
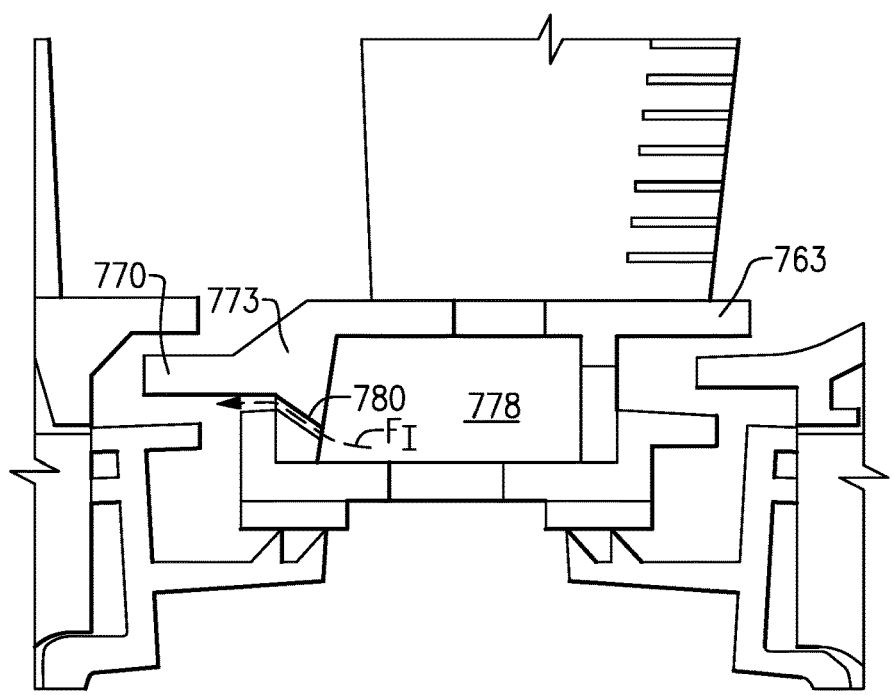
FIG. 9 schematically illustrates another example cooling arrangement.

FIG. 9 illustrates an example inner platform 763 having a forward rail 773 having openings 780. The openings 780 communicate fluid $F_I$ from a cavity 778 provided at least partially by the rail 773 and the platform 763 to a forward lip 770.

Figure 10:
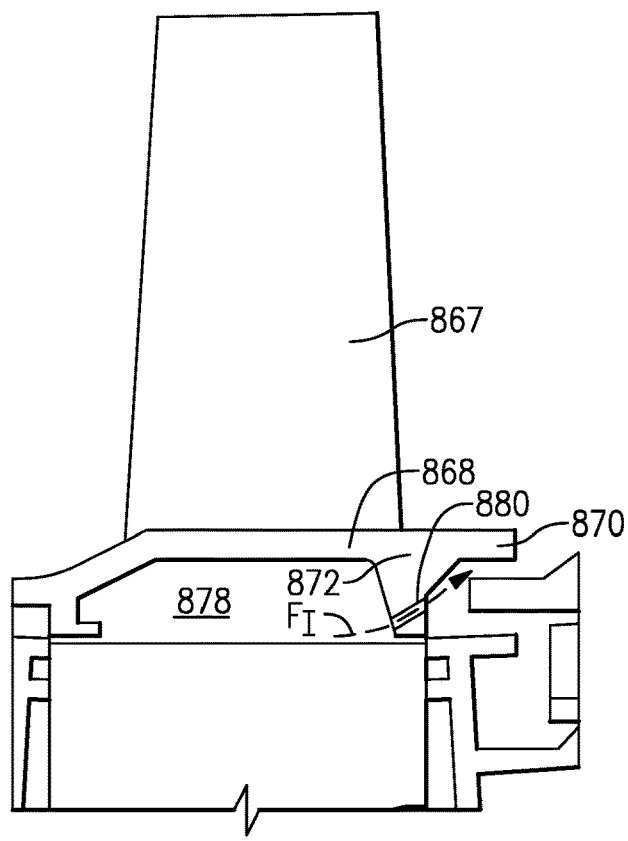
FIG. 10 schematically illustrates another example cooling arrangement.

FIG. 10 illustrates a rotor blade 867 including a rotor platform 868 having openings 880 in a buttress 872 extending inwardly from the rotor platform 868. The openings 880 communicate a fluid $F_I$ from a cavity 878 provided at least partially by the platform 868 and the buttress 872 to a lip 870 of the platform 868.

Figure 11:
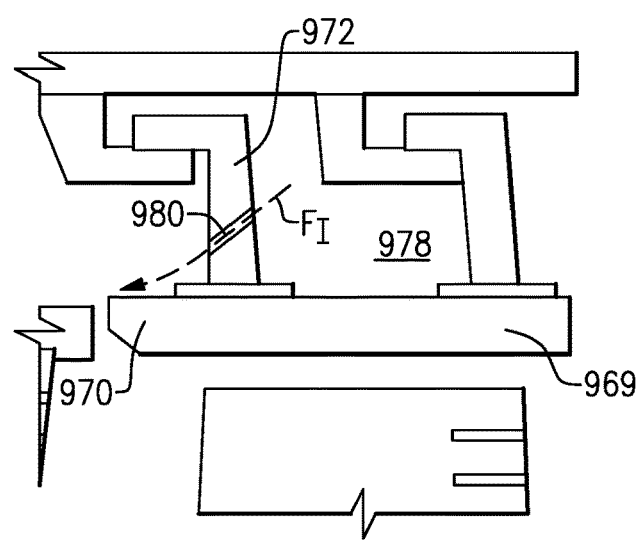
FIG. 11 schematically illustrates another example cooling arrangement.

FIG. 11 illustrates a BOAS 969 having openings 980 in a support rail 972. The openings 980 communicate fluid $F_I$ from a cavity 978 provided at least partially by the BOAS 969 and the rail 972 to a lip 970.

It should be understood that relative positional terms such as "forward," "aft," "upper," "lower," "above," "below," and the like are with reference to the normal operational attitude of the vehicle and should not be considered otherwise limiting.

Although the different examples have the specific components or features shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a turbine section positioned about an engine central longitudinal axis;
   at least one vane section within the turbine section including
      a vane platform providing a lip at an aft end of the platform;
      a rail extending radially from the vane platform with respect to the engine central longitudinal axis and at an axial location spaced from an outer axial extension of the lip, wherein an inner face of the rail and a surface of the vane platform at least partially provide a cavity; and
      at least one opening extending from the inner face to an outer face of the rail opposite the inner face to provide fluid communication from the cavity to the lip, wherein the opening is angled such that an axis extending through the at least one opening intersects a radially inner surface of the lip at a target point configured to receive the fluid communication from the cavity to the lip;
   a support comprising a body portion radially inward of the platform and a first and second extension extending radially outward from the body portion, one of the first and second extension providing a mating face to interface with the outer face of the rail, wherein the one of the first and second extension provides a second opening radially and circumferentially aligned with the at least one opening; and
   a rotor section axially aft of the at least one vane section and having at least one blade extending from a rotor platform, wherein the target point is axially forward of a forward-most surface of the rotor platform, wherein a portion of the vane platform is radially outward of and axially aligned with a portion of the rotor platform to provide a radial gap therebetween, such that the portion of the vane platform and the portion of the rotor platform extend axially along the same portion of the engine central longitudinal axis.

2. The gas turbine engine as recited in claim 1, wherein the axis of the at least one opening and the engine central longitudinal define an angle between 20 and 60 degrees.

3. The gas turbine engine as recited in claim 1, wherein the at least one opening is angled to direct the fluid communication axially along the radially inner surface of the lip and through the radial gap.

4. The gas turbine engine as recited in claim 1, wherein the radially inner surface of the lip extends axially from the outer face of the rail to an aft-most edge of the platform, and the radially inner surface of the lip is parallel with the engine central longitudinal axis.

5. The gas turbine engine as recited in claim 1, comprising:
a forward rail extending radially from the vane platform and spaced forward from the rail, wherein a face of the forward rail partially provides the cavity.

6. The gas turbine engine as recited in claim 1, wherein the body portion includes an orifice for providing an exit of the cavity.

7. The gas turbine engine as recited in claim 6, comprising a second cavity radially inward of the cavity, the orifice providing fluid communication between the cavity and the second cavity.

8. A gas turbine engine, comprising:
a turbine section positioned about an engine central longitudinal axis;
at least one vane section within the turbine section including
a platform providing a lip and having a rail extending radially from the platform with respect to the engine central longitudinal axis and at an axial location spaced from an outer axial extension of the lip, wherein an inner face of the rail and a surface of the platform provide surfaces of a cavity, and a first opening extending from the inner face to an outer face of the rail opposite the inner face to provide fluid communication from the cavity to the lip, and
a support comprising a body portion radially inward of the platform and an extension extending radially outward from the body portion, the extension providing a mating face to interface with the outer face of the rail, wherein the extension provides a second opening radially and circumferentially aligned with the first opening, and the first opening has a first cross sectional area at the outer face, the second opening has a second cross sectional area at the mating face, and the first cross sectional area is different from the second cross sectional area, the body portion provides a surface of the cavity, and the body portion includes an orifice for providing an exit of the cavity; and
a rotor section axially aft of the at least one vane section and having at least one blade extending from a rotor platform, wherein a portion of the vane platform is radially outward of and axially aligned with a portion of the rotor platform to provide a radial gap therebetween, such that the portion of the vane platform and the portion of the rotor platform extend axially along the same portion of the engine central longitudinal axis, and the first opening is configured to provide said fluid communication to the gap.

9. The gas turbine engine as recited in claim 8, wherein the first cross sectional area is greater than the second cross sectional area.

10. The gas turbine engine as recited in claim 9, wherein the first cross sectional area includes a first portion radially outward of the second cross sectional area and a second portion radially inward of the second cross sectional area.

11. The gas turbine engine as recited in claim 8, wherein the second cross sectional area is greater than the first cross sectional area.

12. The gas turbine engine as recited in claim 8, wherein the second cross sectional area includes a first portion radially outward of the first cross sectional area and a second portion radially inward of the first cross sectional area.

13. The gas turbine engine as recited in claim 8, wherein one of the first opening and second opening is angled such that an axis through the opening intersects a radially inner surface of the lip at a target point configured to receive the fluid communication from the cavity to the lip.

14. The gas turbine engine as recited in claim 13, wherein the other of the first opening and the second opening has a greater cross sectional area than the one of the first opening and the second opening.

15. The gas turbine engine as recited in claim 8, comprising a second cavity radially inward of the cavity, the orifice providing fluid communication between the cavity and the second cavity.

16. The gas turbine engine as recited in claim 8, wherein the support is a seal.

17. A gas turbine engine, comprising:
a turbine section positioned about an engine central longitudinal axis;
at least one vane section within the turbine section including
a platform providing a lip and having a rail extending radially from the platform with respect to the engine central longitudinal axis and at an axial location spaced from an outer axial extension of the lip, wherein an inner face of the rail and a surface of the platform provide surfaces of a cavity, and a first opening extending from the inner face to an outer face of the rail opposite the inner face to provide fluid communication from the cavity to the lip, and
a support comprising a body portion radially inward of the platform and an extension extending radially outward from the body portion, the extension providing a mating face to interface with the outer face of the rail, wherein the extension provides a second opening radially and circumferentially aligned with the first opening, and the first opening has a first cross sectional area at the outer face, the second opening has a second cross sectional area at the mating face, and the first cross sectional area is different from the second cross sectional area, and the support includes a second extension extending from the body portion; and
a rotor section axially aft of the at least one vane section and having at least one blade extending from a rotor platform, wherein a portion of the vane platform is radially outward of and axially aligned with a portion of the rotor platform to provide a radial gap therebetween, such that the portion of the vane platform and the portion of the rotor platform extend axially along the same portion of the engine central longitudinal axis, and the first opening is configured to provide said fluid communication to the gap.

18. The gas turbine engine as recited in claim 17, wherein the body portion includes an orifice for providing an exit of the cavity.

19. The gas turbine engine as recited in claim 18, wherein an axis extending through the first opening and the engine central longitudinal define an angle between 20 and 60 degrees.

20. The gas turbine engine as recited in claim 18, comprising a second cavity radially inward of the cavity, the orifice providing fluid communication between the cavity and the second cavity.

* * * * *